Mar. 20, 1923

R. W. EVANS

TIRE CHAIN

Filed July 29, 1919

1,449,092

Inventor
Rudolph W. Evans,
By Fetherstonhaugh & Co.
Attys.

Patented Mar. 20, 1923.

1,449,092

UNITED STATES PATENT OFFICE.

RUDOLPH WILLIAM EVANS, OF HAMILTON, ONTARIO, CANADA, ASSIGNOR TO ROBERT N. EVANS, OF HAMILTON, ONTARIO, CANADA.

TIRE CHAIN.

Application filed July 29, 1919. Serial No. 314,069.

*To all whom it may concern:*

Be it known that I, RUDOLPH WILLIAM EVANS, a citizen of the United States, and residing in the city of Hamilton, in the county of Wentworth, Province of Ontario, Dominion of Canada, have invented certain new and useful Improvements in Tire Chains, of which the following is the specification.

My invention relates to improvements in tire chains and the object of the invention is to so improve the construction of the cross chains used on the tire, so that it will not only be more durable but also will have a greater gripping contact with the surface of the road-bed, whereby not only side slip but also a longitudinal slip and slewing may be prevented to a miximum extent.

My invention consists of a chain provided with a central link formed up of a blank having lateral and longitudinal bars so shaped that when formed up they will form cross bars connected by longitudinal bars in the centre, the longitudinal bars being also bent crosswise into arc-shaped form. The side links are formed up of a blank having the ends where they are connected also arc-shaped in form so as to be engaged by the curved end bars of the central link, whereby a minimum amount of cutting friction is provided and the parts are otherwise constructed and arranged in detail as hereinafter more particularly explained.

In the drawings like characters of reference indicate corresponding parts in the different views.

I shall first describe the central link in the way it is formed up.

1 is a sheet metal plate or blank having the lateral extensions $1'$ having central recesses $1^2$ and the longitudinal extensions $1^3$ comparatively narrow and provided with the end enlarged $1^4$ having a reduced portion $1^5$.

Figure 1:
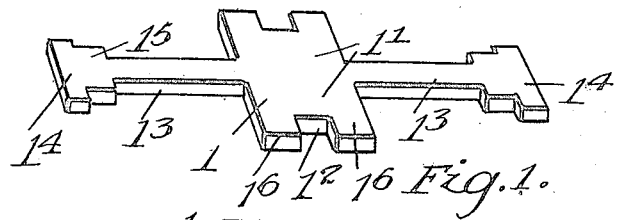
Figure 1 is a perspective view of the blank of the central link as cut out.
Figure 2:
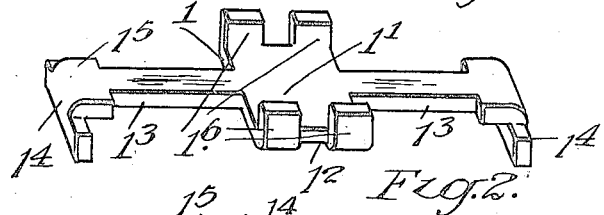
Figure 2 is a similar view partially bent up.

In Figure 2 it will be seen that the sides $1^6$ of the lateral extensions are struck up by the die practically at right angles to the plate and that the broad ends $1^4$ are struck down by the die practically at right angles.

Figure 3:
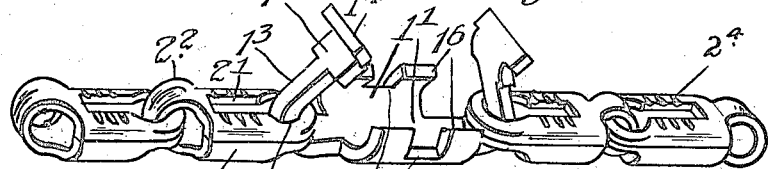
Figure 3 is a view of portion of the chain including the central link still further bent up.

The narrow portions $1^3$ of the plate have at the same time a slight curve imparted to them from side to side. In Figure 3 the central link is shown connected to the side links and the chain being further struck up, and in Figure 4 the central link is completely formed up and connected to the side links, the broad ends of the portions $1^4$ forming a longitudinal bar which extends at both ends into the notches $1^2$. In this latter figure the sides $1^6$ are substantially bent at right angles, the form of the link as completed is clearly shown in Figures 7 and 8.

In reference to the side links it will be noticed that each link 2 is struck up out of a single piece of metal formed in rounded cross section at both top and bottom with narrow slots $2'$, a shank $2^2$ curvular in cross section as indicated and an enlarged open end $2^3$ of arc-shape form.

Figure 4:
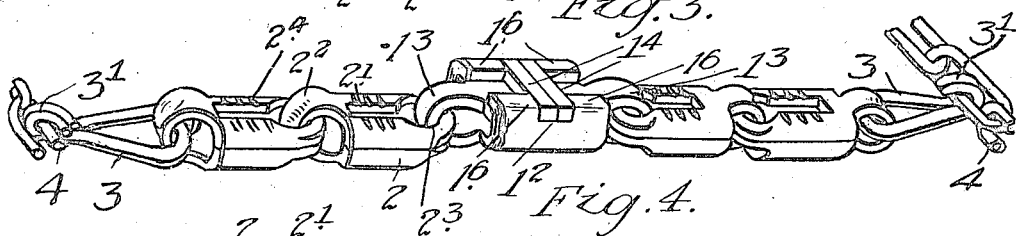
Figure 4 is a view of the chain with the central link completely formed up.
Figure 5:
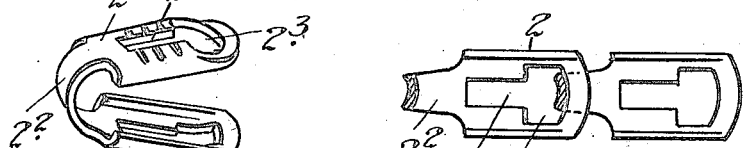
Figure 5 is a perspective detail of a side link before being completely closed up.
Figure 6:
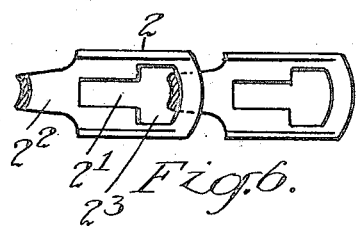
Figure 6 is a plan view showing two of the side links in section.

Said links are located together by the shank $2^2$ extending through the curvular slotted ends $2^3$, the central link also is connected to the side link in a similar manner as indicated (see Figs. 3 and 4).

Having now described the principal parts involved in my invention I shall briefly describe its utility.

I have found that the central link formed as above described provides a central longitudinal bar $1^4$ and laterally extending side wings $1^6$ with recesses between them and thereby the chain is prevented at the centre where the pressure is the heaviest from sliding laterally or longitudinally. In fact from slewing to any appreciable extent.

The connections from link to link, it will be seen, also are of curvular shanks extending through recessed arc-shaped ended links thereby minimizing the frictional action of the shanks on the end of the links.

It will thus be seen that I have provided a very simple, durable and strong form of cross tie chain in which the central link is very effectual in preventing sliding or longitudinal slipping of the tire. The chain is also formed of a smooth rounded section where it contacts with the tire and consequently it is not liable to deleteriously wear the tire.

I may mention that in forming the side links I have preferably provided indentures $2^4$ which are designed to aid in preventing lateral slip.

Figures 7, 8:
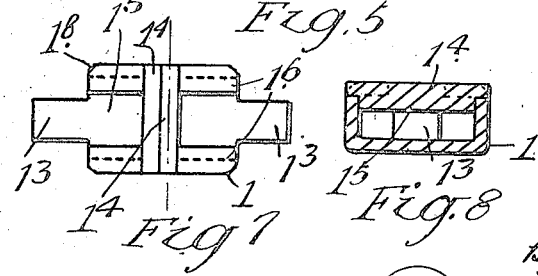
Figure 7 is a plan of the central link.
Figure 8 is a cross section of the central link.
Figure 9:
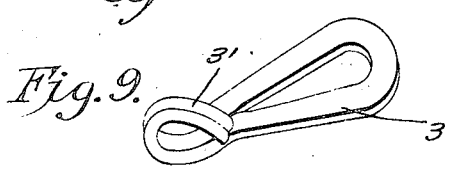
Figure 9 is a detail view of an end hook.

I may also mention that the centre link 1 is as indicated in Figure 7, bent inwardly at $1^6$ when being formed up against the narrow portion $1^5$ so that there is a grip on the narrow portion which will further aid in preventing any tendency of the narrow portion being drawn outwardly and thereby weaken the link, in fact this bending inwardly of the portion $1^6$ serves to make another lock in addition to the lock formed by the end $1^4$.

In the specification I have not referred particularly before to the end hooks shown in Figure 4, I may say these end hooks 3 have inwardly extending upper hook portions 3 bent laterally from a position parallel to the link of the chain to an inclined position, the one hook at one side being reversely bent to that of the other. These hooks pass over the circumferential chain 4 and any tendency of the cross chain to turn from its flat position on the tire to either side is effectually prevented by reason of the bend of these hooks each of which serves to throw the cross chain back to its flat position on the face of the tire no matter which way it will have a tendency to turn.

From the foregoing it will be observed that the center link of the cross member comprises an enlarged central or body portion having at opposite sides a pair of loop-forming projections $1^3$ terminating in broadened ends having crosswise or transversely extending bars extending beyond said broadened ends, and which bars are bent at right angles to said broadened ends, said central or body portion also having at opposite sides upwardly and inwardly turned recessed projections overlapping the broadened ends of said loop-forming projections, the crosswise or transverse bars of the latter fitting into the recesses of said second pair of projections whereby a very strong and rigid, durable and long-wearing center link is provided.

Although I have described my invention in its present preferred form it is to be understood that I do not limit myself to the construction herein shown and described except in so far as defined in the claims and embraced within the scope thereof.

What I claim as my invention is:

1. A center link for the cross member of an anti-skid chain comprising an enlarged body portion having a pair of loop-forming projections terminating in broadened ends having transversely extending bars extending beyond said broadened ends, said body also having a pair of inwardly turned recessed projections overlapping said broadened ends, the transversely extending bars fitting into the recesses of said projections.

2. A center link for the cross member of an anti-skid chain comprising an enlarged body portion having a pair of loop-forming projections terminating in broadened ends having transversely extending bars located at right angles to the broadened ends, said body also having a pair of inwardly turned recessed projections overlapping said broadened ends, the transversely extending bars fitting into the recesses of said projections.

3. A center link for the cross member of an anti-skid chain comprising an enlarged body portion having a pair of loop-forming projections terminating in broadened ends having transversely extending bars located at right angles to the broadened ends, said body also having a pair of inwardly turned recessed projections extending inwardly flush with the bars, the transversely extending bars fitting into the recesses of said projections.

4. A cross chain member for an anti-skid chain having at each end a link bent to form a hook having an outer hook portion extending inwardly, said outer hook portion at one end of the cross member being bent laterally in an opposite direction to the hook portion on the other end of the cross member whereby the tendency of the cross chain to turn from its flat position to either side is effectually prevented.

5. A cross member for an anti-skid chain comprising a center link, and a plurality of side links terminating in a pair of connecting hooks, each hook having its outer end bent from a position parallel to the link of the chain to a laterally inclined position, one hook on one end of the cross member being reverse to that of the other on the other end of the cross member whereby the chain is prevented from turning from a flat position.

6. A center link for the cross member of an anti-skid chain formed from a sheet metal blank and comprising a central portion having a pair of loop forming projections provided with transversely extending cross bars, said central portion also having a pair of recessed projections overlapping the ends of the loop forming projection and into the recesses of which the transversely extending cross bars are located.

7. A cross member for an anti-skid chain comprising a plurality of links terminating at each end in an end hook, the outer hook portion thereof bent to extend diagonally relatively to the body of the hook.

8. A cross member for an anti-skid chain comprising a plurality of articulated links consisting of a center link, and a plurality of side links and having at its opposite ends a pair of links reversely twisted to form hooks, the outer hooked portion of one of said hooks being bent laterally in an opposite direction to the outer hook portion of the other of said hooks.

9. A cross member for an anti-skid chain having a plurality of articulated links and comprising a pair of reversely twisted hooks, one at each end of said cross member, each of said hooks having the outer end thereof twisted laterally in one direction thereby to extend diagonally relative to the longitudinal axis of the cross member.

10. A cross chain for an anti-skid device having at each end a hooked link, each adapted to be connected to an independent side chain, said hooked links having their hooks laterally deflected in reverse directions thereby to resist the turning of the cross chain to either side.

11. A center link for an anti-skid cross chain formed from a sheet metal blank and comprising a body portion having a locking projection extending from each outer edge thereof, and a pair of eye-forming projections having headed ends, the latter adapted to be overlapped by said locking projections.

12. A center link for an anti-skid cross chain formed from a sheet metal blank and comprising a relatively wide body portion having a plurality of spaced locking projections formed from each outer edge thereof and also having a pair of narrow eye-forming portions terminating in heads, the latter adapted to be overlapped by the locking projections.

13. A center link for an anti-skid cross chain formed from a sheet metal blank comprising a relatively wide body portion having a plurality of locking projections spaced apart and formed and extending from each outer lateral edge thereof and having at its ends a pair of relatively narrow eye-forming projections terminating in I-formed heads, the eye-forming projections being bent to bring the heads into engagement with the body and the locking projections being bent to overlap such heads.

14. A sheet metal blank for a center link comprising a relatively wide body having a plurality of spaced locking projections formed and extending from each extreme outer lateral edge thereof, and a relatively narrow loop-forming projection at each end, each terminating in an I-formed head.

15. A sheet metal blank for a center link comprising a body having a plurality of spaced apart locking projections formed from each side edge thereof, and a narrow loop forming projection at each end thereof.

16. A pressed sheet metal blank for a center link comprising a relatively wide body having a locking projection at each side edge, and a narrow loop forming projection at each end terminating in enlarged heads.

RUDOLPH WILLIAM EVANS.

Witnesses:
GERTRUDE NICHOLSON,
J. W. Y. MITCHELL.